Sept. 12, 1944.  C. D. BECKER  2,357,804
TEMPORARY EMERGENCY SEAL FOR PUNCTURED CONTAINERS
Filed June 5, 1942
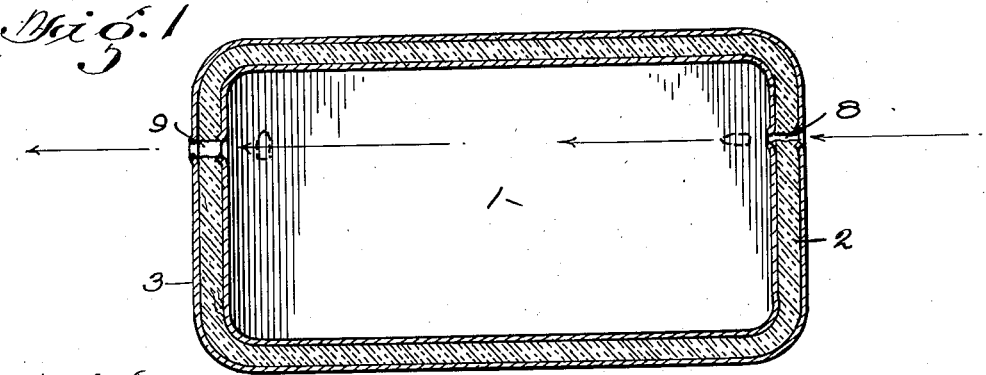
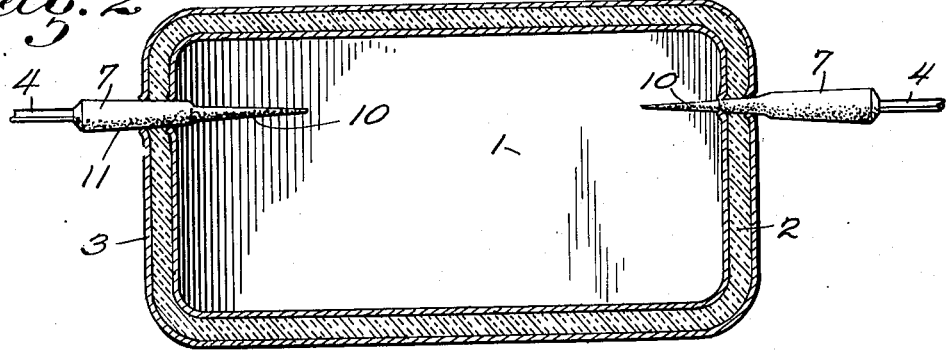
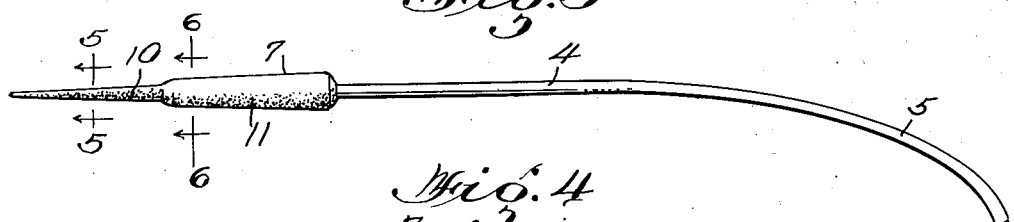
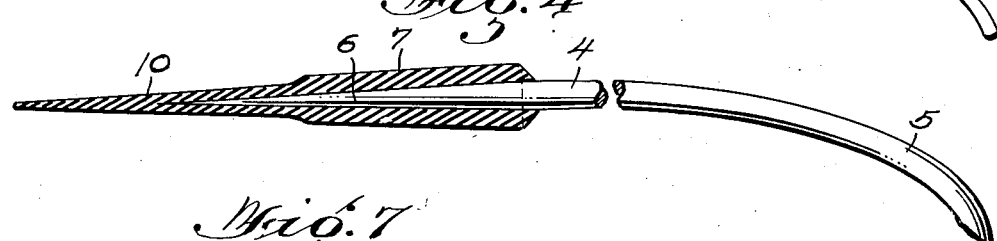
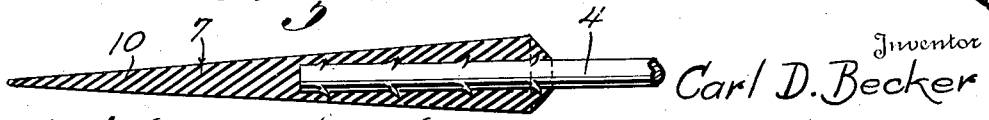
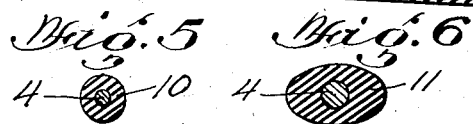
Inventor
Carl D. Becker
By
Attorney Patented Sept. 12, 1944

2,357,804

UNITED STATES PATENT OFFICE 2,357,804

TEMPORARY EMERGENCY SEAL FOR PUNCTURED CONTAINERS

Carl D. Becker, United States Army, Washington, D. C.

Application June 5, 1942, Serial No. 445,976

1 Claim. (Cl. 220—24)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates broadly to an emergency seal or plug for punctured liquid containers or punctured floatation devices, and more specifically to means for temporarily sealing a bullet hole in a tank truck or the fuel tank of a motor vehicle.

It is now standard practice in the army to cover tank trucks and the gas tanks of its combat motor vehicles with a protective casing held firmly in place by a canvas covering. Said protection is effective to some extent against flying fragments of shells, richocheting bullets and many other injuries due to the rough usage to which army vehicles are necessarily subjected. Said protection, however, is not effective against a direct hit of a large bullet which will not only penetrate the protective casing, but the tank also, and will at times pass entirely through the tank and its casing. It is for the purpose of temporarily sealing such punctures that the present article is provided.

The objects in view are to provide a simple, effective, and cheaply produced article of manufacture that may be conveniently carried on motor vehicles or flotation devices, that will be easily accessible to the operator and adapted to be promptly applied to cut off the flow of fuel from the fuel tank if an emergency, such as referred to above, should occur.

It will be understood that while a preferred embodiment of the invention is shown and described, slight changes may be resorted to without departing from the spirit of the invention, or fall beyond the scope of the claims.

Similar numerals indicate corresponding parts shown in the attached drawings in which:

Fig. 1 is a vertical section of a receptacle or tank, such as a gasoline fuel tank in use on army motor vehicles, showing punctures caused by a bullet.

Fig. 2 is a similar view, showing the improved emergency seals in place.

Fig. 3 is a view of the entire emergency seal for punctured containers.

Fig. 4 is an enlarged sectional view, showing the preferred form of the emergency seal.

Fig. 5 is a section on line 5—5 of Fig. 4.

Fig. 6 is a section on line 6—6 of Fig. 4.

Fig. 7 is a view similar to Fig. 4, showing a modified means of securing the sealing compound in place.

Referring to the drawings: 1 indicates the usual tank, 2 the protective casing, and 3 the canvas covering of a fuel tank.

The sealing device comprises a body or supporting member 4, consisting of a stick or light shaft of treated or synthetic, non-combustible material, preferably curved at one end 5, to provide a convenient handhold for an operator when inserting the seal in place.

The sealing end of the shaft is preferably tapered at 6, and is provided with a covering of a tough compressible material, such as the usual rubber, reclaimed rubber, or any other suitable compound that will function in the desired manner.

The sealing compound 7 is preferably applied to the shaft by curing it in place, or by other means for firmly securing the sealing material to the shaft or body portion of the device to prevent the separation of the sealing material and the shaft when the seal is being inserted into, or withdrawn from the puncture in the tank, thereby avoiding undesirable results, and providing for repeated use of the seal.

The herein described sealing article is intended for use only as a temporary emergency sealing means for stopping the flow of fuel until the tank can be emptied and to minimize, or entirely eliminate adding further fuel to that previously discharged that may have become ignited.

In passing entirely through a tank, the bullet after penetrating the near wall will very often tumble and pass out through the far side of the tank sideways or in a flat position, thus producing a round puncture 8 in the near wall, and an elongated puncture of elliptical form 9 in the far wall of the tank, and it is for the purpose of sealing the two forms of punctures that the sealing material is shaped in such a manner as to meet said conditions. Therefore, the forward or pointed portion 10 of the sealing material is circular in cross section as shown in Fig. 5, which extends approximately one-half the length of the sealing material, and merges at that point into elliptical form 11 in cross section as seen in Fig. 6. By said means the forward end of the seal is inserted into the circular opening caused by the entrance of the bullet into the tank and effectually seals same. If the bullet has passed entirely through the tank and produces an elongated opening in the tank on the far side, another sealing member may be inserted from the opposite side of the tank into the larger or elongated opening a sufficient distance to cause the enlarged portion of the sealing material to enter the larger aperture and seal same as effectively as the smaller aperture is sealed by the use of duplicate sealing articles.

In practice it is contemplated to provide seals of various sizes, each tank truck carrying two each of four sizes, for instance, in a quiver attached to the fire extinguisher in a convenient position for prompt use when required.

In operation should a bullet puncture the gasoline tank of a motor vehicle, the operator can promptly and conveniently insert or thrust a seal such as here described of the proper size into the puncture and cut off the flow of fuel and thereby not only prevent the loss of fuel, but prevent fire or diminish the size of same and avoid the damage and danger referred to above.

Ordinarily the seals herein shown and described may be used a number of times, but should the outer or handle portion of the seal tend to drag the seal out of the puncture when a long run for repairs is necessary, the body or shaft portion of the seal may be cut off, and the drag on the plug, due to the vibration of the vehicle, that will tend to displace same and cause a leak, will be relieved.

Having fully described my invention, what I claim and desire to secure by Letters Patent, is:

A temporary emergency seal for punctured containers comprising an elongated rod having one end curved to form a handle portion and the opposite end tapered, and an elongated plug of compressible material mounted on the tapered end of said rod, said plug being substantially circular in cross section from its outermost end to a point intermediate its ends and substantially elliptical in cross section from said intermediate point to its innermost end, and said plug being progressively tapered from a small diameter at its outermost end to a larger cross-sectional dimension at its innermost end.

CARL D. BECKER.